(12) United States Patent
Nitsche et al.

(10) Patent No.: US 9,983,331 B2
(45) Date of Patent: May 29, 2018

(54) QUASI-OPTICAL WAVEGUIDE

(71) Applicant: Halliburton Energy Services, Inc., Houston, TX (US)

(72) Inventors: Wolfgang Hartmut Nitsche, Humble, TX (US); John L. Maida, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days. days.

(21) Appl. No.: 15/128,338

(22) PCT Filed: Oct. 14, 2015

(86) PCT No.: PCT/US2015/055569
§ 371 (c)(1),
(2) Date: Sep. 22, 2016

(87) PCT Pub. No.: WO2017/065765
PCT Pub. Date: Apr. 20, 2017

(65) Prior Publication Data
US 2017/0276828 A1    Sep. 28, 2017

(51) Int. Cl.
| | | |
|---|---|---|
| G02B 6/26 | (2006.01) |
| G01V 8/00 | (2006.01) |
| G01V 8/02 | (2006.01) |
| G02B 6/38 | (2006.01) |
| E21B 47/12 | (2012.01) |

(52) U.S. Cl.
CPC ............ G01V 8/005 (2013.01); E21B 47/123 (2013.01); G01V 8/02 (2013.01); G02B 6/262 (2013.01); G02B 6/3801 (2013.01)

(58) Field of Classification Search
CPC ........ G02B 6/12007; G02B 6/30; G02B 6/43; G02B 6/26; H01L 2924/00014; H01L 2924/00
See application file for complete search history.

(56) References Cited

U.S. PATENT DOCUMENTS

| | | | | |
|---|---|---|---|---|
| 3,976,355 | A | * | 8/1976 | Matthews ............ G02B 6/3809 385/68 |
| 4,398,121 | A | | 8/1983 | Chodorow et al. |
| 4,620,170 | A | | 10/1986 | Lavering |
| 4,963,842 | A | | 10/1990 | Patel |
| 2008/0309577 | A1 | | 12/2008 | Mittleman et al. |
| 2014/0035698 | A1 | * | 2/2014 | Schadler ................. H01P 1/184 333/128 |
| 2015/0086152 | A1 | | 3/2015 | Samson et al. |
| 2017/0260850 | A1 | * | 9/2017 | Nitsche ................... E21B 47/12 |

OTHER PUBLICATIONS

"U.S. Appl. No. PCT/US2015/055569, International Search Report dated Jul. 14, 2016", 3 pgs.
"U.S. Appl. No. PCT/US2015/055569, Written Opinion dated Jul. 14, 2016", 10 pgs.

* cited by examiner

*Primary Examiner* — Jennifer Doan
(74) *Attorney, Agent, or Firm* — Haynes & Boone, LLP

(57) ABSTRACT

A quasi-optical waveguide apparatus includes a waveguide having a chamber formed by a substantially cylindrical body and configured to propagate terahertz radiation. A plurality of windows are included wherein each window is coupled to a respective end of the waveguide such that the chamber is substantially sealed from the ambient atmosphere. The plurality of windows are transparent to the terahertz radiation.

14 Claims, 5 Drawing Sheets

QUASI-OPTICAL WAVEGUIDE

PRIORITY APPLICATIONS

This application is a U.S. National Stage Filing under 35 U.S.C. § 371 from International Application No. PCT/US2015/055569, filed on Oct. 14, 2015, which application is incorporated herein by reference in its entirety.

BACKGROUND

In drilling wells for oil and gas exploration, understanding the structure and properties of the associated geological formation provides information to aid such exploration. Measurements may be performed in a borehole to obtain this information. However, the environment in which the drilling tools operate and where measurements are made may be located at significant distances below the surface. It may be desirable to transmit downhole measurements to the surface for analysis and control purposes.

Electrical cables have been investigated for high speed communications to and from downhole tools. Use of electrical cables for such communication, however, has drawbacks due to limitations with information bandwidth. Optical fibers have also been investigated for high speed communications to and from downhole tools to overcome the information bandwidth limitations of electrical cables. However, optical fiber cables typically need near perfect optical alignment at their connections in order to achieve low signal loss.

DETAILED DESCRIPTION

Some of the challenges noted above, as well as others, may be addressed by using a quasi-optical waveguide that propagates frequencies in a terahertz (THz) frequency range. Thus, the quasi-optical waveguide may be used in a downhole environment for telemetry between, for example, between a bottom hole assembly (BHA) and the surface. The quasi-optical waveguide described herein may provide reliable communications at data bandwidths and signal losses that approximate optical fiber communications without the problems inherent in using optical fiber for downhole telemetry.

Subsequent discussion of the quasi-optical waveguide refers to the THz range of frequencies. This range is only for purposes of illustration as any frequencies that are approximately in the THz range will also be propagated by the quasi-optical waveguide. For example, frequencies in a range of approximately 0.1 THz to approximately 10 THz may be considered within the THz range of frequencies.

The subsequent discussion also refers to the use of quasi-optical waveguides and quasi-optical frequencies. Quasi-optical represents an intermediate regime between conventional optics and electronics. The quasi-optical term may thus be defined as related to the description of signals in the far-infrared or THz region of the electromagnetic spectrum.

Figure 1:
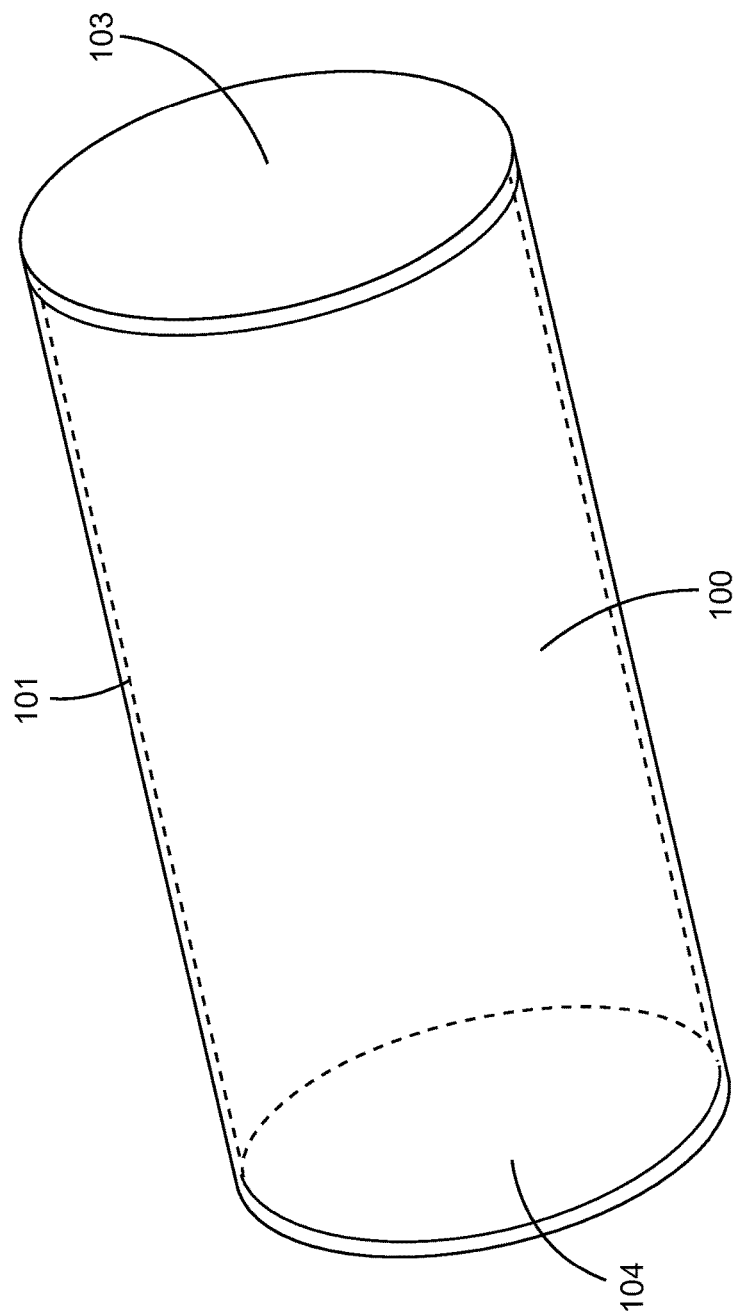
FIG. 1 is a diagram showing a quasi-optical waveguide segment, according to various embodiments.

FIG. 1 is a diagram showing a quasi-optical waveguide segment, according to various embodiments. The segment includes a substantially cylindrical body 101 that encloses a chamber 100. The chamber is sealed from the ambient atmosphere by two dielectric plugs 103, 104 (e.g., windows, dielectric windows) on either end of the substantially cylindrical body 101.

The body 101 of the segment may comprise any material that enables the waveguide to propagate THz frequency signals. For example, the body 101 may comprise a metal pipe (e.g., copper). In another embodiment, the body 101 may be some material (e.g. steel or nonmetallic material) and the inner surface of the body 101 may be lined with a metal (e.g. gold).

The body 101 is shown and described as "cylindrical". The "cylindrical" description may include any shape that is approximately cylindrical such as, for example, oval.

The windows 103, 104 may comprise any material that is transparent to THz frequencies as well as able to withstand the temperature and pressures of the downhole environment. For example, the windows 103, 104 may be sapphire or some other similar material.

The windows 103, 104 typically comprise a thickness that is less than a wavelength of the terahertz radiation being propagated through the segment. For example, THz radiation with a frequency of around 0.3 THz has a wavelength of around 1 millimeter (mm). Thus, if the windows have a thickness of substantially less than 1 mm, the THz radiation passes through the windows 103, 104 without being affected by them. In other words, the windows are transparent to the THz radiation. This is based on the general rule that electromagnetic waves cannot resolve any structure that is smaller than their wavelength and, therefore, the waves can penetrate layers that are much thinner than their wavelength. A window 103, 104 with a thickness of less than 0.1 mm may allow a wider range of THz frequencies.

The chamber 100 of the waveguide segment is sealed from the ambient atmosphere by the windows 103, 104 coupled to their respective ends of the axial length of the body 101. Moisture in the atmosphere is known to limit the propagation of signals at THz frequencies. Thus, the chamber 100 of the waveguide may be at an approximate vacuum, a partial vacuum (e.g., less than 1 atmosphere) with a gas having a diffraction index of approximately 1, a gas atmosphere at approximately atmospheric pressure, or a combination of any of these. For example, the gas may be nitrogen, argon, and/or helium.

Figure 2:
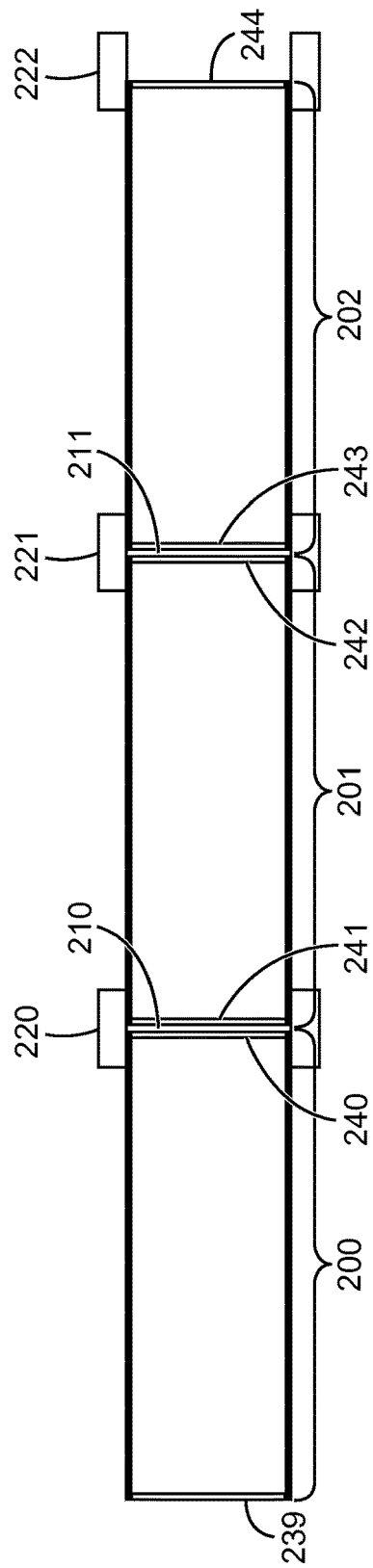
FIG. 2 is a cross-sectional diagram showing a quasi-optical waveguide, according to various embodiments.

FIG. 2 is a cross-sectional diagram showing a quasi-optical waveguide, according to various embodiments. This waveguide is made up of a plurality of waveguide segments 200-202, such as illustrated in FIG. 1.

Adjacent waveguide segments 200, 201 or 201, 202 of the waveguide are coupled together with sleeves 220-222 surrounding joints 210, 211. For example, the window 240 of a first segment 200 is immediately adjacent to the window 241 of a second segment 201 and the sleeve 220 surrounds a joint 210 formed between the adjacent waveguide segments 200, 201. Thus, the waveguide comprises a plurality of windows 239-244, each window 239-244 may be coupled to a respective end of the waveguide such that the chamber is substantially sealed from ambient atmosphere.

Using the waveguide segment design of FIG. 2, the windows 239-244 do not need to be thick enough to withstand the relatively high pressures inside of the borehole since they are protected by airtight sleeves 220-222. The windows 239-244 only need to withstand the pressures to which they may be exposed during transportation from a factory to an oilfield. If the waveguide segments contain a vacuum, the windows 239-244 should be able to withstand pressure of at least one atmosphere (e.g., approximately 100 kilopascals (kPa), approximately 15 pounds per square inch (psi)). If the waveguide segments are filled with a gas at a pressure similar to approximately atmosphere, pressure balancing may be used such that the windows 239-244 only have to withstand pressure differentials that are much less than atmospheric pressure.

In pressure balancing, the waveguide segments may be filled with, for example, one atmospheric pressure of a gas under standard atmospheric conditions (e.g., approximately 100 kPa at 300 K). Thus, during the transport of the waveguide sections from the factory to the oilfield, approximately the same pressure acts upon the window from the inside as from the outside. This enables relatively thin windows (e.g., less than 0.1 mm) to be used since the windows only have to withstand small differential pressures. When the waveguide segments are joined together into a waveguide and lowered into a borehole where the temperature is higher (e.g., up to 500 K), the internal pressure of the gas in the waveguide segments will increase. This will not cause problems with the windows since adjacent waveguide sections that are directly connected to each other will experience approximately the same temperature. The joints will be at nearly the same pressure as applied to the windows from both sides which means that windows are still experiencing pressure balanced conditions.

During construction of the waveguide by coupling together the plurality of waveguide segments, a viscous liquid (e.g., gel, grease) may be applied to one or both windows 239-244 of the joints 210, 211 to aid in purging foreign matter (e.g., dirt, water) from between the adjacent windows 240, 241 or 242, 243. If two adjacent windows are brought into contact, that contact may trap moisture or foreign particles between the adjacent windows. The moisture may degrade the propagation performance of the waveguide and the foreign matter may cause stress points and, thus, fractures of the windows from the pressure of the windows on the foreign matter. In an embodiment, the viscous liquid is a refraction index matching viscous liquid.

Inserting a dielectric window into the beam path of electromagnetic radiation may cause signal losses through at least two different loss mechanisms. The first loss mechanism is the dielectric absorption of the radiation. This attenuation (expressed in dB) is directly proportional to the thickness of the dielectric material. Thus for very thin windows, as described previously, the signal loss becomes negligible. The second loss mechanism is the reflection at the surfaces of the dielectric material. This mechanism is explored in FIG. 3.

Figure 3:
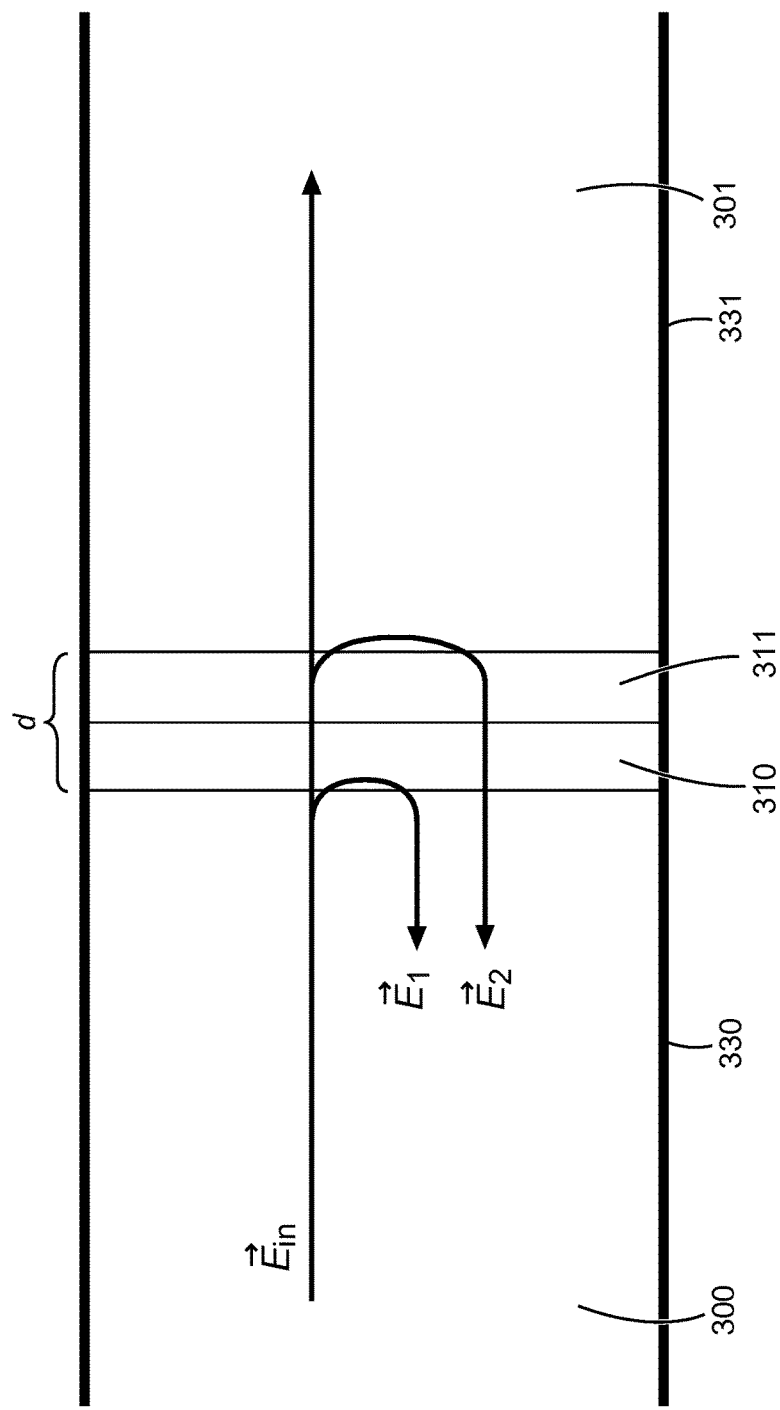
FIG. 3 is a cross-sectional diagram showing reflections through a dielectric window, according to various embodiments.

FIG. 3 is a cross-sectional diagram showing reflections through a dielectric window, according to various embodiments. This figure describes one theory of how the dielectric plugs (e.g., windows) are transparent to the THz frequency range radiation. The figure illustrates an example with two adjacent waveguide segments 330, 331 that are coupled together at their windows 310, 311 and having sealed chambers 300, 301 with a vacuum or gas, as previously described.

If the waveguide chamber 300, 301 is filled with a vacuum or a gas with a refraction index of 1 and the dielectric material has an index of refraction of n>1, reflection can occur both when the radiation (vector $\vec{E}_1$) enters the dielectric material 310, 311 and when the radiation (vector $\vec{E}_2$) leaves the dielectric material 310, 311. If the incoming radiation that hits the dielectric material has the electric field vector $\vec{E}_{in}$, then the radiation that is reflected at the time when the radiation enters the window is $$\vec{E}_1 = \frac{1-n}{1+n}\vec{E}_{in}.$$

For very thin windows, the radiation that is reflected at the second interface where the radiation leaves the window is approximately $$\vec{E}_2 = \frac{n-1}{1+n}\vec{E}_{in}.$$

This means that the total reflected signal is $$\vec{E}_{reflected} = \vec{E}_1 + \vec{E}_2 = \frac{1-n}{1+n}\vec{E}_{in} + \frac{n-1}{1+n}\vec{E}_{in} = 0.$$

In other words, there is no reflected signal and all of the signals are transmitted (i.e., the dielectric is transparent). The fact that the two reflected waves cancel out is a result of the total thickness of the dielectric (i.e., both windows 310, 311) being much less than the wavelength of the signal ($d \ll \lambda$) If the thickness d of the windows has to be considered, an additional phase factor of $\exp(2\pi n 2d/\lambda)$ for $\vec{E}_2$ exists which means that $\vec{E}_1$ and $\vec{E}_2$ may no longer cancel out.

Figure 4:
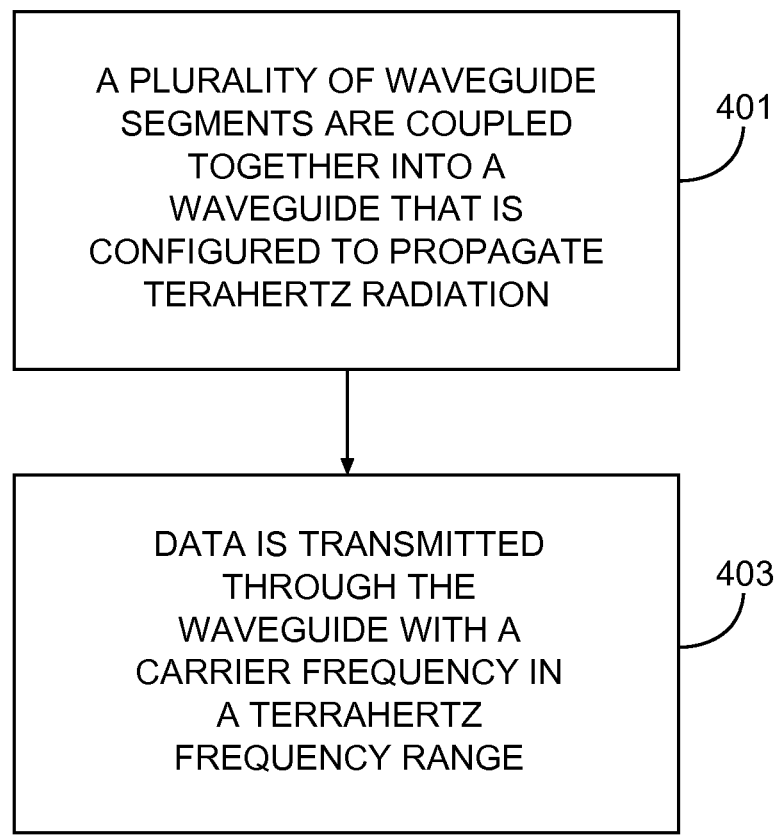
FIG. 4 is a flowchart of a method for operation of a quasi-optical waveguide in a downhole environment, according to various embodiments.

FIG. 4 is a flowchart of a method for operation of a quasi-optical waveguide in a downhole environment, according to various embodiments. This method is for purposes of illustration only as other methods may be used for operation of the quasi-optical waveguide in the downhole environment.

In block 401, a plurality of waveguide segments are coupled together into a waveguide that is configured to propagate terahertz frequency radiation. For example, the embodiments of the waveguide segments and the waveguide of FIGS. 1 and 2 described previously are examples of a waveguide configured to propagate terahertz radiation. In an embodiment, the viscous liquid (e.g., grease, gel) may be added between adjacent windows of adjacent waveguide segments prior to coupling the adjacent waveguide segments.

In block 403, data is transmitted through the waveguide, from either the surface or from downhole, with a carrier frequency in a terahertz frequency range (e.g., 0.1 THz to 10 THz). The data from either downhole or the surface is encoded by modulating the terahertz frequency range carrier prior to transmission through the waveguide.

Figure 5:
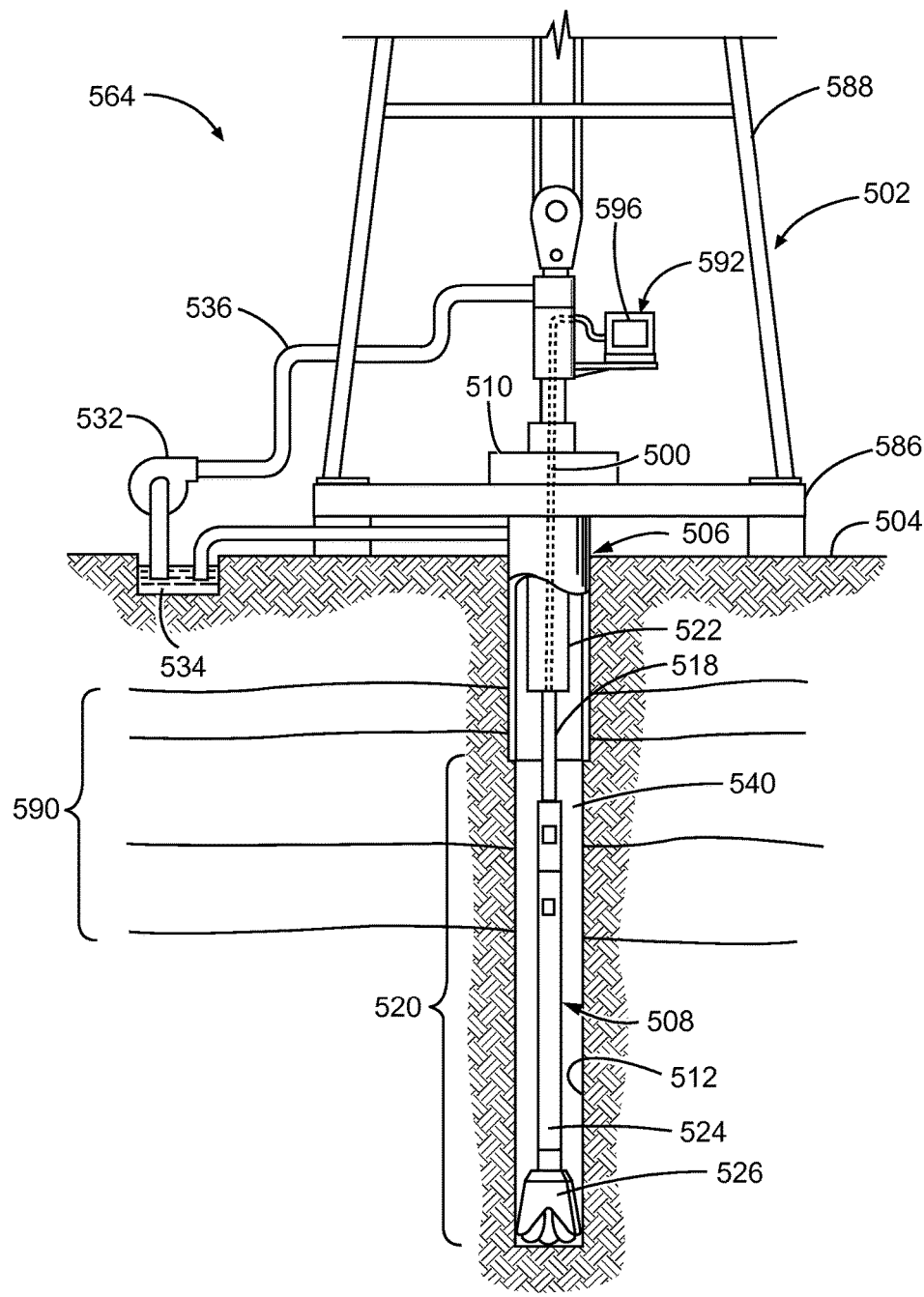
FIG. 5 is a diagram showing a drilling system, according to various embodiments.

FIG. 5 is a diagram showing a drilling system, according to various embodiments. The system 564 includes a drilling rig 502 located at the surface 504 of a well 506. The drilling rig 502 may provide support for a drillstring 508. The drillstring 508 may operate to penetrate the rotary table 510 for drilling the borehole 512 through the subsurface formations 590. The drillstring 508 may include a drill pipe 518 and the bottom hole assembly (BHA) 520 (e.g., drill string), perhaps located at the lower portion of the drill pipe 518.

The quasi-optical waveguide 500 described previously may be disposed in the drill string to the BHA. In another embodiment, the waveguide 500 is external to the drill string 508. Thus, the waveguide 500 enables the BHA to communicate with the surface workstation 592.

The BHA 520 may include drill collars 522, a down hole tool 524, stabilizers, sensors, an RSS, a drill bit 526, as well as other possible components. The drill bit 526 may operate to create the borehole 512 by penetrating the surface 504 and the subsurface formations 590.

During drilling operations within the cased borehole 512, the drillstring 508 (perhaps including the drill pipe 518 and the BHA 520) may be rotated by the rotary table 510. Although not shown, in addition to or alternatively, the BHA 520 may also be rotated by a motor (e.g., a mud motor) that is located down hole. The drill collars 522 may be used to add weight to the drill bit 526. The drill collars 522 may also operate to stiffen the bottom hole assembly 520, allowing the bottom hole assembly 520 to transfer the added weight to the drill bit 526, and in turn, to assist the drill bit 526 in penetrating the surface 504 and subsurface formations 590.

During drilling operations, a mud pump 532 may pump drilling fluid (sometimes known by those of ordinary skill in the art as "drilling mud") from a mud pit 534 through a hose 536 into the drill pipe 518 and down to the drill bit 526. The drilling fluid can flow out from the drill bit 526 and be returned to the surface 504 through an annular area 540 between the drill pipe 518 and the sides of the borehole 512. The drilling fluid may then be returned to the mud pit 534, where such fluid is filtered. In some examples, the drilling fluid can be used to cool the drill bit 526, as well as to provide lubrication for the drill bit 526 during drilling operations. Additionally, the drilling fluid may be used to remove subsurface formation cuttings created by operating the drill bit 526.

A workstation 592 including a controller 596 may include modules comprising hardware circuitry, a processor, and/or memory circuits that may store software program modules and objects, and/or firmware, and combinations thereof that are configured to execute at least the data transmission step of the method of FIG. 4. The workstation 592 may also include modulators and demodulators for modulating and demodulating data transmitted downhole through the waveguide or received through the waveguide from the downhole environment. The modulated data is transmitted and received at approximately terahertz carrier frequencies. The workstation 592 and controller 596 are shown near the rig 502 only for purposes of illustration as these components may be located at remote locations.

These implementations can include a machine-readable storage device having machine-executable instructions, such as a computer-readable storage device having computer-executable instructions. Further, a computer-readable storage device may be a physical device that stores data represented by a physical structure within the device. Such a physical device is a non-transitory device. Examples of a non-transitory computer-readable storage medium can include, but not be limited to, read only memory (ROM), random access memory (RAM), a magnetic disk storage device, an optical storage device, a flash memory, and other electronic, magnetic, and/or optical memory devices.

Example 1 is an apparatus comprising: a waveguide having a chamber formed by a substantially cylindrical body and configured to propagate terahertz radiation; and a plurality of windows, each window coupled to a respective end of the waveguide such that the chamber is substantially sealed from ambient atmosphere, wherein the plurality of windows are transparent to the terahertz radiation.

In Example 2, the subject matter of Example 1 can further include wherein the waveguide comprises a plurality of waveguide segments, each segment comprising a respective sealed chamber formed by the cylindrical body and a respective window of the plurality of windows coupled to each end of the cylindrical body such that each waveguide segment is individually sealed from the ambient atmosphere.

In Example 3, the subject matter of Examples 1-2 can further include wherein adjacent waveguide segments of the waveguide are coupled together with sleeves such that the window of a first segment is immediately adjacent to the window of a second segment and the sleeve surrounds a joint formed between the adjacent waveguide segments.

In Example 4, the subject matter of Examples 1-3 can further include a viscous liquid disposed between the window of the first a segment and the window of the second segment.

In Example 5, the subject matter of Examples 1-4 can further include wherein the terahertz radiation comprises frequencies in a range of 0.1-10 terahertz.

In Example 6, the subject matter of Examples 1-5 can further include wherein the windows comprise a thickness of less than 0.1 mm.

In Example 7, the subject matter of Examples 1-6 can further include wherein the cylindrical body comprises a metal.

In Example 8, the subject matter of Examples 1-7 can further include wherein an inner surface of the cylindrical body is coated with a metal.

In Example 9, the subject matter of Examples 1-8 can further include wherein the chamber sealed from the ambient atmosphere comprises a vacuum, a partial vacuum, nitrogen, argon, and/or helium.

Example 10 is a method comprising: coupling together a plurality of waveguide segments into a waveguide configured to propagate terahertz radiation, each waveguide segment comprising a substantially cylindrical body enclosing a chamber sealed by a respective window coupled to each end of an axial length of the cylindrical body, wherein the windows comprise a thickness of less than one wavelength of radiation and are transparent to terahertz radiation; and transmitting data through the waveguide with a carrier frequency in a terahertz frequency range.

In Example 11, the subject matter of Example 10 can further include wherein transmitting the data through the waveguide with a carrier frequency in the terahertz frequency range comprises transmitting the data with the carrier frequency in a frequency range of 0.1 THz to 10 THz.

In Example 12, the subject matter of Examples 10-11 can further include adding a viscous liquid between adjacent windows of adjacent waveguide segments prior to coupling the adjacent waveguide segments.

In Example 13, the subject matter of Examples 10-12 can further include wherein the viscous liquid is a gel.

In Example 14, the subject matter of Examples 10-13 can further include wherein the chamber is sealed from ambient atmosphere and contains a gas with an index of refraction of approximately 1.

Example 15 is a system comprising: a waveguide disposable in a borehole, the waveguide comprising a plurality of waveguide segments coupled together at a joint between adjacent waveguide segments, each waveguide segment comprising a chamber sealed from ambient atmosphere by a dielectric plug on each end of an axial length of the chamber. Wherein each waveguide segment is configured to propagate terahertz radiation and each dielectric plug is transparent to terahertz radiation and a sleeve coupled around each joint.

In Example 16, the subject matter of Example 15 can further include wherein each dielectric plug comprises a thickness that is less than a wavelength of terahertz radiation.

In Example 17, the subject matter of Examples 15-16 can further include wherein the plurality of windows comprise sapphire.

In Example 18, the subject matter of Examples 15-17 can further include wherein the plurality of windows comprise a thickness of less than 0.1 millimeter.

In Example 19, the subject matter of Examples 15-18 can further include wherein each waveguide segment comprises a chamber sealed from ambient atmosphere.

In Example 20, the subject matter of Examples 15-19 can further include wherein the waveguide is disposed in a drill string.

Although specific examples have been illustrated and described herein, it will be appreciated by those of ordinary skill in the art that any arrangement that is calculated to achieve the same purpose may be substituted for the specific examples shown. Various examples use permutations and/or combinations of examples described herein. It is to be understood that the above description is intended to be illustrative, and not restrictive, and that the phraseology or terminology employed herein is for the purpose of description. Combinations of the above examples and other examples will be apparent to those of skill in the art upon studying the above description.

What is claimed is:

1. An apparatus comprising:
   a waveguide having a chamber formed by a substantially cylindrical body and configured to propagate terahertz radiation; and
   a plurality of windows, each window coupled to a respective end of the waveguide such that the chamber is substantially sealed from ambient atmosphere, wherein the plurality of windows are transparent to the terahertz radiation, and wherein the waveguide comprises a plurality of waveguide segments, each segment comprising a respective sealed chamber formed by the cylindrical body and a respective window of the plurality of windows coupled to each end of the cylindrical body such that each waveguide segment is individually sealed from the ambient atmosphere.

2. The apparatus of claim 1, wherein adjacent waveguide segments of the waveguide are coupled together with sleeves such that the window of a first segment is immediately adjacent to the window of a second segment and the sleeve surrounds a joint formed between the adjacent waveguide segments.

3. The apparatus of claim 1, further comprising a viscous liquid disposed between the window of the first segment and the window of the second segment.

4. The apparatus of claim 1, wherein the terahertz radiation comprises frequencies in a range of 0.1-10 terahertz.

5. The apparatus of claim 1, wherein the windows comprise a thickness of less than 0.1 mm.

6. The apparatus of claim 1, wherein the cylindrical body comprises a metal.

7. The apparatus of claim 1, wherein an inner surface of the cylindrical body is coated with a metal.

8. The apparatus of claim 1, wherein the chamber sealed from the ambient atmosphere comprises a vacuum, a partial vacuum, nitrogen, argon, and/or helium.

9. A system comprising:
   a waveguide disposable in a borehole, the waveguide comprising a plurality of waveguide segments coupled together at a joint between adjacent waveguide segments, each waveguide segment comprising a chamber sealed from ambient atmosphere by a dielectric plug on each end of an axial length of the chamber, wherein each waveguide segment is configured to propagate terahertz radiation and each dielectric plug is transparent to terahertz radiation; and
   a sleeve coupled around each joint.

10. The system of claim 9, wherein each dielectric plug comprises a thickness that is less than a wavelength of terahertz radiation.

11. The system of claim 9, wherein each dielectric plug comprises sapphire.

12. The system of claim 9, wherein each dielectric plug comprises a thickness of less than 0.1 millimeter.

13. The system of claim 9, wherein each sleeve provides an airtight seal for the joint the sleeve is coupled around.

14. The system of claim 9, wherein the waveguide is disposed in a drill string.

* * * * *